united States Patent [19]

Fiacconi et al.

[11] Patent Number: 4,862,354
[45] Date of Patent: Aug. 29, 1989

[54] MULTIPROCESSOR SYSTEM WITH INTERRUPT NOTIFICATION AND VERIFICATION UNIT

[75] Inventors: Claudio Fiacconi, Arcore; Antonio Franzosi, Pavia, both of Italy

[73] Assignee: Honeywell Bull Italia S.p.A., Milan, Italy

[21] Appl. No.: 859,593

[22] Filed: May 5, 1986

[30] Foreign Application Priority Data

May 7, 1985 [IT] Italy .............. 20599 A/85

[51] Int. Cl.$^4$ ............................. F06F 13/14
[52] U.S. Cl. ..................................... 364/200
[58] Field of Search ... 364/200 MS File, 900 MS File, 364/300 MS File

[56] References Cited

U.S. PATENT DOCUMENTS

| | | | |
|---|---|---|---|
| 4,402,046 | 8/1983 | Cox et al. | 364/200 |
| 4,404,628 | 9/1983 | Angelo | 364/200 |
| 4,420,806 | 12/1983 | Johnson, Jr. et al. | 364/200 |
| 4,449,182 | 5/1984 | Rubinson et al. | 364/200 |
| 4,543,627 | 9/1985 | Schwab | 364/200 |
| 4,590,556 | 5/1986 | Berger et al. | 364/200 |

Primary Examiner—Thomas M. Heckler
Assistant Examiner—Rebecca L. Adams
Attorney, Agent, or Firm—A. A. Sapelli; J. S. Solakian

[57] ABSTRACT

A multiprocessor system architecture in which two processors are each provided with an autonomous bus and the two buses can be selectively connected to each other to form a unique system bus which enables access by all processors to common memory resources connected to one of the autonomous buses. The communication between processors takes place through messages stored into mailboxes located in the common memory. The presence of a message is evidenced by a notify/interrupt signal generated by a logic unit to which each processor has access to modify and verify the logic unit's status, using the processor's autonomous bus, and without interfering with operations using the other autonomous buses of the other processor. Such verification and access does not require access to common memory resources nor polling operations to verify the status of messages stored into "mailboxes".

6 Claims, 2 Drawing Sheets

MULTIPROCESSOR SYSTEM WITH INTERRUPT NOTIFICATION AND VERIFICATION UNIT

BACKGROUND OF THE INVENTION

1. Field of the Invention

The present invention relates to a multiprocessor system architecture and more particularly to method and apparatus by which the processors communicate with one another.

2. Description of the Prior Art

Several types of multiprocessor system architectures have been suggested. Bus communication architectures are among those more commonly used because of the good performances they offer at relatively low cost and without undue complexity. In such architectures, the several processors are connected to one another and to one or more memories through a communication bus accessible in a time sharing manner. An example of such a bus system architecture is disclosed by U.S. Pat. No. 4,404,628.

The communication bus of such architectures constitutes a set of leads enabling each of the processors to communicate with one or more common or "shared" memories and with one or more common peripherals.

The communication mechanism, or method, of communication between processors and peripherals is generally direct, that is, the processor selects, by suitable commands, a peripheral unit and if that unit is free, or available, the processor sends suitable commands to it. The processor, therefore, operates as the "master" with respect to peripheral units which operate as "slaves".

Peripheral units may initiate communications with the master processor by interrupt mechanisms, that is, the peripheral unit, which has a need to communicate information to a processor, generates an interrupt signal on an interrupt lead which is not part of the system bus. In due time, the processor which receives the interrupt signal, once the execution of current operations has been completed, or suspended, responds to the interrupt by "testing" with suitable commands the interrupting unit to identify the nature and the reasons for such interruption. This type of communication mechanism, both method and apparatus, between processors and peripherals units is effective but requires the assignment of the different roles of master and slave to a processor and the peripheral units respectively.

In the case of communication between processors, which can be a central unit, or CPU, or a peripheral unit control processor or "I/O processor", but which are however intended to operate in an autonomous manner and with equal rights to that of a CPU, or as masters, a different communication mechanism which does not require changes in the roles of the processors involved in the communication process is preferred. A mechanism, or method for accomplishing this is to provide communications through mailboxes in a shared memory which can be accessed by several processors. Memory areas, or mailboxes, are defined, with each mail box being dedicated to or connected with a given processor but accessible by all processors of the system.

Thus, a processor A, if it wants to communicate with a processor B, simply writes a message into the mailbox for processor B. How does processor B know that a message is present for it in its' mailbox, and how does processor A know that its message has been received by processor B? A solution taught by the prior art is polling, a procedure by which each processor periodically verifies the content of the mailbox. In other words, processor B periodically reads information stored in its mailbox to verify the presence of messages addressed to processor B. Likewise processor A may read the contents of processor B's mailbox to determine if processor B has received a message sent by A, as well as to periodically check its own mailbox to verify the presence of an answer message from B written into A's own mailbox. This process requires a considerable amount of time which degrades system performance essentially for two reasons: the first reason being that each processor has to spend time conducting polling operations, and the second reason being that, the polling operation requires a read memory operation and the use of the common bus to which the memory is connected. Thus, two fundamental common resources are used (memory and bus) which prevent their being used by the other processors, for example.

A process for signaling the presence of a message, very similar to the interrupt process, has therefore been associated with the use of mailboxes to provide communications between processors. Such a process is defined as a notify process. The already mentioned U.S. patent discloses an embodiment of such a process.

In the notify process, processor A, after writing a message into processor B's mailbox, generates a notify signal which is received and stored by processor B (for instance in a flip-flop). Thus, processor B does not have to conduct a memory polling operation to verify the presence of messages addressed to it, but only has to periodically verify the status of its notify flip-flop which does no require using system common resources. However, with this process, the problem of most effectively using the common resources of a system is only partially solved. The reason being that if processor A wants to determine if a message it sent to processor B has been received, processor A may go to the common memory to verify if its message has been read out of B's mailbox, or it can wait for an answer message from processor B, using the method of mailbox writing and notification similar to that already described. In both cases, it is evident that the use of common resources and the operation of one or both processors is required. An aspect that has to be considered is the handling, at program level, of notify signals, and the problem of eliminating interference in accessing shared resources such as mailboxes.

In the handling of programs in execution in multiprocessor systems, preemption operations are often used. With reference to the notify process, the preemption concept means that a message written into processor A's mailbox by processor B can be canceled if the receiving processor, processor A, has not yet taken any action with respect to the message in its mailbox. Processor B does this by sending a new message to be substituted for the message previously stored by it in A's mailbox. This may be required if during the execution of programs, the execution of an operation which was previously transmitted to processor A's mailbox and which was the subject of a notify signal, is no longer necessary or desirable. Preemption operations have been implemented in the art by having the sending processor read out the message previously written into the mailbox by it to verify that the message has not been considered by the receiving processor and thereafter the sending processor writes another message into the receiving processor's mailbox, and sends another notify signal.

It is clear that to carry out such verification operations, an access to memory is required which prevents other units from concurrently using the shared resources (bus and memory). To prevent interference in the access to common resources, the commonly adopted solution involves the use of a "Test and Set" instruction. A memory location, a mailbox, is coupled to, or associated, with each common resource. In such a location binary information is written to indicate if that resource is available, or is locked, or not available for use. A processor which wants to access a resource (mailbox) to write a message, must, first of all, verify that no processor is using that resource at the same instant. Therefore, before accessing the resource, a processor executes an indivisible read and write operation, Test & Set, of the memory location coupled, or associated with that resource.

Through such an operation, the processor reads out the preexisting contents of the location and immediately thereafter writes or rewrites information into that location and thus locks that resource. This operation is possible only in systems where the instruction Test & Set is one that can be executed, and, again, it requires the use of common resources (memory and bus) to prevent concurrent use by other units.

BRIEF SUMMARY OF THE INVENTION

All memory access operations, even if for different reasons, impose limitations that reduce system performance. These limitations are overcome by the multiprocessor system architecture of the present invention, where a system bus is physically and logically separated into two independent parts but which parts can be connected to each other. Each part of the system bus constitutes an autonomous, or logical, subsystem bus for each of the processors. An interrupt signal which is the equivalent of a notify signal is generated by interrupt logic of each processor, Each processor also has at least one flip-flop which is addressable by the processor for read and set operations through its own system bus, and addressable by the other processors for reset operations through the system bus of said other processor.

The advantages achieved with this kind of architecture are:

any need for a memory polling operation to verify the presence of a notify message is avoided;

each processor can determine the status of a notify message it has sent without having to access common memory resources of the system, and requires only the use of its own local or subsystems bus, each processor can execute a preemption or a notify operation for new messages without the necessity of verification of the contents of the mailbox, a message acknowledge signal is supplied without requiring a reverse notify operation; and if required, interference problems are solved without requiring the execution of "Test and Set" operations.

In other words, the use of the common resources is reduced to a minimum through the use of circuit elements which significantly improves system performances.

BRIEF DESCRIPTION OF THE DRAWINGS

These and other features and advantages of the invention will appear clearly from the following description of a preferred embodiment and from the enclosed drawings where.

DETAILED DESCRIPTION

Figure 1:
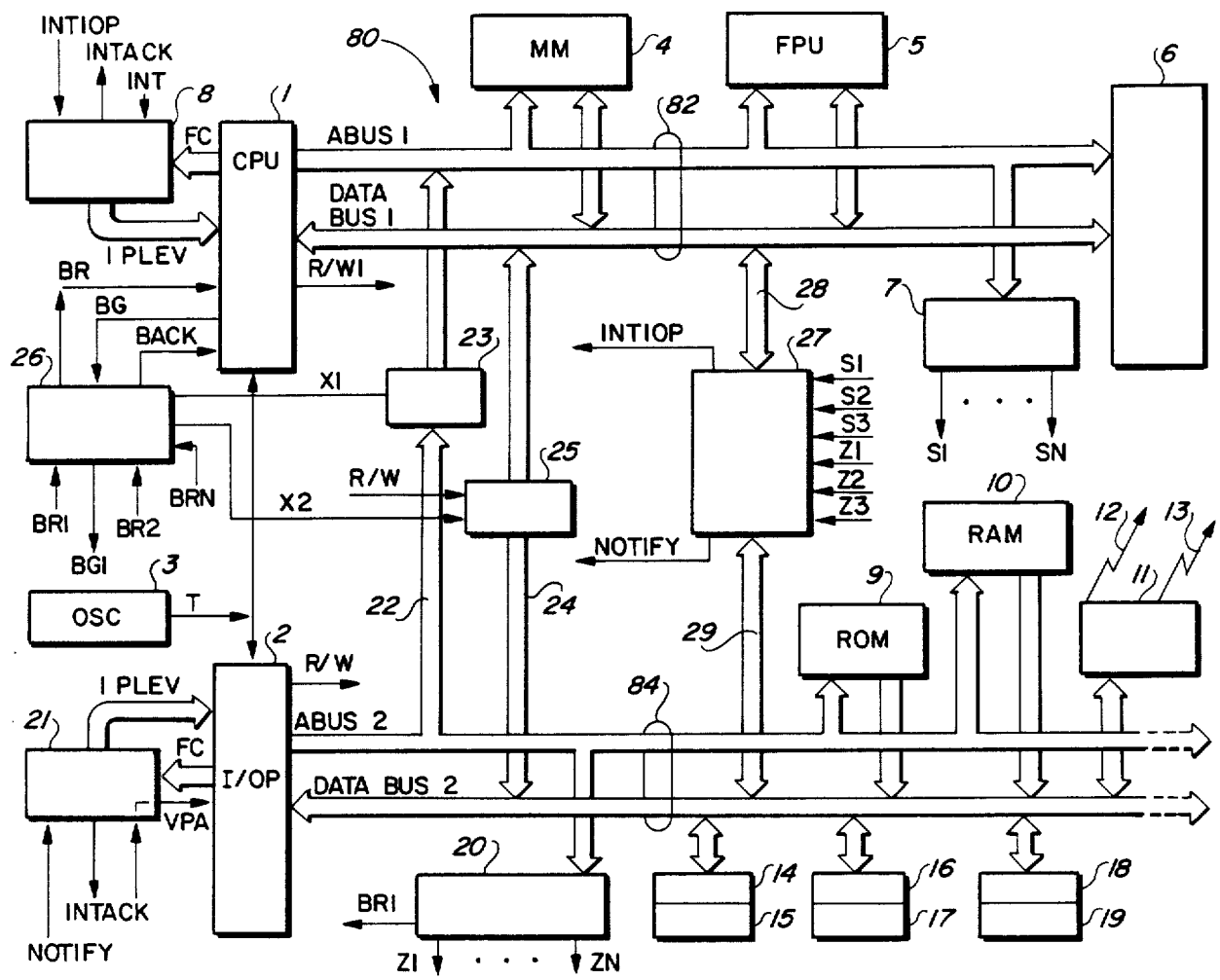
FIG. 1 illustrates in block diagram the EDP system architecture of the invention, with a system having two processors.

FIG. 1 is a block diagram of the EDP system architecture, or system, 80 of the invention. The system 80 is essentially constituted by a first processor, or CPU 1 acting as a central unit and by a second processor, or I/OP 2 acting as a peripheral control unit. Preferably the processors consist of microprocessors, such as the 68010 or 68000 marketed by Motorola, Inc. CPU 1 is connected to an address bus ABUS 1 and to a data bus, DATA BUS 1, constituting subsystem bus 82 for CPU 1. I/OP 2 is connected to address bus ABUS 2 and to data bus DATA BUS 2 constituting subsystem bus 84 for input/output processor I/OP 2. An oscillator 3 supplies timing pulses T to both the CPU 1 and I/OP 2 and to other system units. A working, or main, random access memory 4 is connected to buses DATA BUS 1 and ABUS 1.

In addition to memory 4, a floating point unit FPU 5, a bus expansion unit 6, for providing communications to a system bus of another logical nit or peripheral unit, for example, are connected to subsystem bus 82. The selection of, or addressing, of memory 4, floating point unit 5, expansion unit 6 and other possible units, is effected in a known way, by CPU 1 using timing and control signals together with suitable address codes. To do this, decoder 7, preferably constituted by one or more programmable array logic, PAL, units has its inputs connected to bus ABUS 1 and produces as its output, selection signals S1, . . . , SN, each one selecting a corresponding one of the several units 4, 5, connected to subsystem bus 82. The units connected to subsystem bus 82 of CPU 1 are always slaved to commands sent by CPU 1 over bus 82, provided a direct access to memory 4 is not present. Units 4, 5 and 6 can only request CPU 1 to intervene by means of interrupt signals (INT). These INT signals are collected by interrupt logic unit 8 which transfers them, according to a hierarchical priority and in a mutually exclusive way, to CPU 1. Logic unit 8 receives an acknowledge signal from CPU 1 when an interrupt is accepted and sends an acknowledge signal to the interrupting unit. CPU 1, buses ABUS 1, DATA BUS 1 and units 3, 4, 5, 6, 7, 8 constitute a data processing system able to operate in an autonomous way as is well known in the art. Further detailed explanation are not, therefore, required.

Likewise, processor I/OP 2 controls input/output bus 84 constituted by channels, or buses, ABUS 2 and DATA BUS 2. Several units are connected to the input/output bus 84 of I/OP 2, namely: a read only memory, or ROM, 9 which memory is designed to contain initialization programs, a working memory, or RAM 10, a communications controller unit 11 for communication lines 12, 13, a tape control unit 14 for a magnetic tape unit 15, a printer control unit 16 for printer 17, a disk control unit 18 for magnetic disk unit 19 and a decoder 20, preferably constituted by one or more PAL's for producing selection commands Z1, . . . , ZN, for the several units connected to input/output bus 84.

The units connected to I/O bus 84 are always slaved to commands sent to them by processor I/OP 2 over bus 84. Controllers such as 11, 14, 16, 18 can only ask for the intervention of control processor I/OP 2, operating as a system central unit, by issuing interrupt signals. These signals, INT, are received by interrupt logic unit 21, which transfers them, according to a hierarchical priority and in a mutually exclusive way, to I/OP 2. Logic unit 21 also receives an interrupt acknowledge signal from I/OP 2 and sends such signal to the interrupting unit. I/OP 2, buses ABUS 2, DATA BUS 2 and units 9, 10, 11, 12, 13, 14, 15, 16, 17, 18, 19, 20 constitute a data processing system able to operate in an autonomous way as is well known in the art. Further detailed explanations, thus, are not therefore required for its understanding.

The elements of system architecture 80 characterizing the invention are the manner of interconnecting the two systems including CPU 1 and I/OP 2 particularly the communication mechanism between the two processors CPU 1 and I/OP 2. Address channel ABUS 2 is connected to address channel ABUS 1 through a unidirectional channel 22, from ABUS 2 to ABUS 1 controlled by a set of gates or "drivers" 23, enabled by a selection signal X1. DATA BUS 2 is connected to DATA BUS 1 through bidirectional channel 24 which is controlled by a set of bidirectional gates, or transceivers, 25, enabled by a selection command X2, which enables effective signal transfer, and by a command R/W which, according to its logical level, defines the transfer direction. Commands X1, X2 are indirectly generated by processor I/OP 2 through conflict resolving unit 26 while the command R/W is directly generated by processor I/OP 2. It is therefore clear that processor I/OP 2, by controlling gates 23, 25, may access subsystem bus 82 for addressing and read/write operations related to memory 4 which is used as common resource by both CPU 1 and processor I/OP 2.

It is obviously necessary to settle any conflicts and interferences in accessing bus 82 and/or memory 4. For this purpose, conflict solving unit 26 is provided. Unit 26 receives bus access request signal BR1 from processor I/OP 2. In addition, unit 26 receives bus request signal BR2, . . . BRN from other possible units, which may require accessing common memory over bus 82. Signal BR1 is generated by I/OP 2 through decoder 20, and BR1 is transferred from unit 20 to a suitable CPU 1 input as signal BR.

Most microprocessors presently available and, particularly, the Motorola 68010 used in the preferred embodiment, are provided with an input terminal for this purpose. CPU 1's response to such a signal is to produce a bus grant signal (BG) and actually allows access to bus 82 at the completion of the operation in execution. Signal BG is routed by unit 26 to the requesting unit, in this case I/OP 2, signal BG1 according to a priority logic.

Unit 26 includes a Motorola I.C., Part No. 68452 and logical circuits, timed by system clock signals T. Unit 26 on receipt of a signal and after detecting that bus 82 is actually available, generates in suitable sequence and length, a signal BACK which is sent to CPU 1, a selection and enabling command X1 sent to gates 23, and a selection and enabling command X2 sent to gates 25. As a result processor I/OP 2 can use, or share, in a time sharing sense, subsystem bus 82 and main memory 4. It should be noted that CPU 1 can not use I/OP bus 84 nor can CPU 1 control any of the units connected to bus 84 in the same manner.

Figure 2:
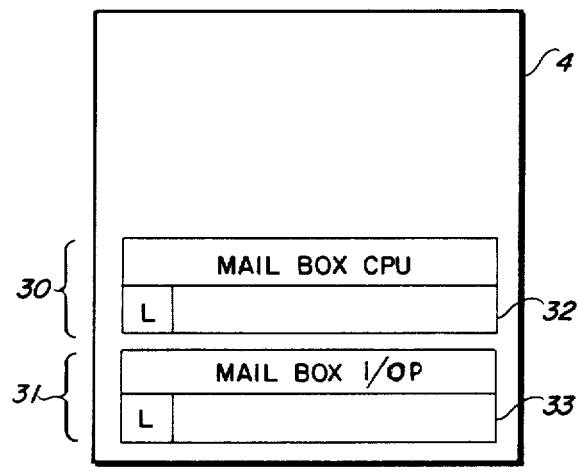
FIG. 2 illustrates in block form the assignment of particular memory areas, mailboxes, to the specific functions of common resources and of locking registers for the common resources.

Referring to FIG. 2, memory 4 contains two zones, 30, and 31. Zone 30 is named MAILBOX CPU and Zone 31 is named MAILBOX I/OP, both of which are used as communication means. Memory locations 32, 33 respectively are coupled to, or associated with, each zone. The contents of these associated zones define the status of a mailbox. In each such location, the contents of at least a cell "L" defines, as a function of the logic level of the bit contained therein, the lock bit, if the coupled resource, the mailbox, is available or not. A mailbox is available if no processor is executing a read/write operation to that mailbox. A mailbox is locked if a processor is already executing an operation in the same memory zone, and that the processor does not want any other processor to access and/or modify the contents of its associated mailbox. When processor I/OP 2 wants to communicate with CPU 1, it tests memory location 3 with a Test & Set operation, that is, with an indivisible read/write operation and will set cell L, or store a logical one in cell L. If, however, through a read operation, processor I/OP 2 detects that cell L of memory location 32, for example, is already at a logical level 1, then associated mailbox 30 is not available, or is locked, and processor I/OP 2 abstains from any further operation on MAILBOX CPU 30. If, on the other hand, I/OP 2 detects that the binary signal stored in cell L of location 32 is a logical zero, that resource can be locked by writing a logical 1 into cell L and I/OP 2 can therefore address MAILBOX CPU 32 and write a message for CPU 1 into mailbox 30. At the end of these operations, by resetting lock bit L to logical level 0, I/OP 2 makes resource, or mailbox 30, available for read/write operations performed by CPU 1.

Similar operations are executed by CPU 1 to read/delete a message addressed to it and for writing a message for I/OP 2 into MAILBOX I/OP 31. As memory 4 is a passive unit, processors 1 and 2 can verify if messages addressed to them are present only through a memory polling operation, that is through periodic testing with the result that memory 4 and system bus 82 are locked, or in use during such a polling operations which prevents the execution of other operations at such times.

To overcome this inconvenience, direct processor notify hardware is provided the status of which can be detected by both the notified processor and the notifying one. Further, both the setting of the notify hardware and its resetting, as well as the detection of its status by the notifying processor requires only limited use of the processor's local bus, that is subsystem bus 82 for CPU 1 and of I/O bus 84 for I/OP 2 respectively and, therefore, such operations do not interfere with operations at the system level but only with local level operations such a central processing or input/output operations respectively. The notify hardware consists, with reference to FIG. 1, of a notify logic unit 27 selectively connected to DATA BUS 1 and to DATA BUS 2 through channels 28 and 29 respectively.

Unit 27 is controlled by selection signals/commands S1, S2, S3, Z1, Z2, Z3 coming from decoders 7 and 20 and generates two or more notify or interrupt signals NOTIFY, and INTIOP which are sent to interrupt logical units 21 and 8 respectively.

Figure 3:
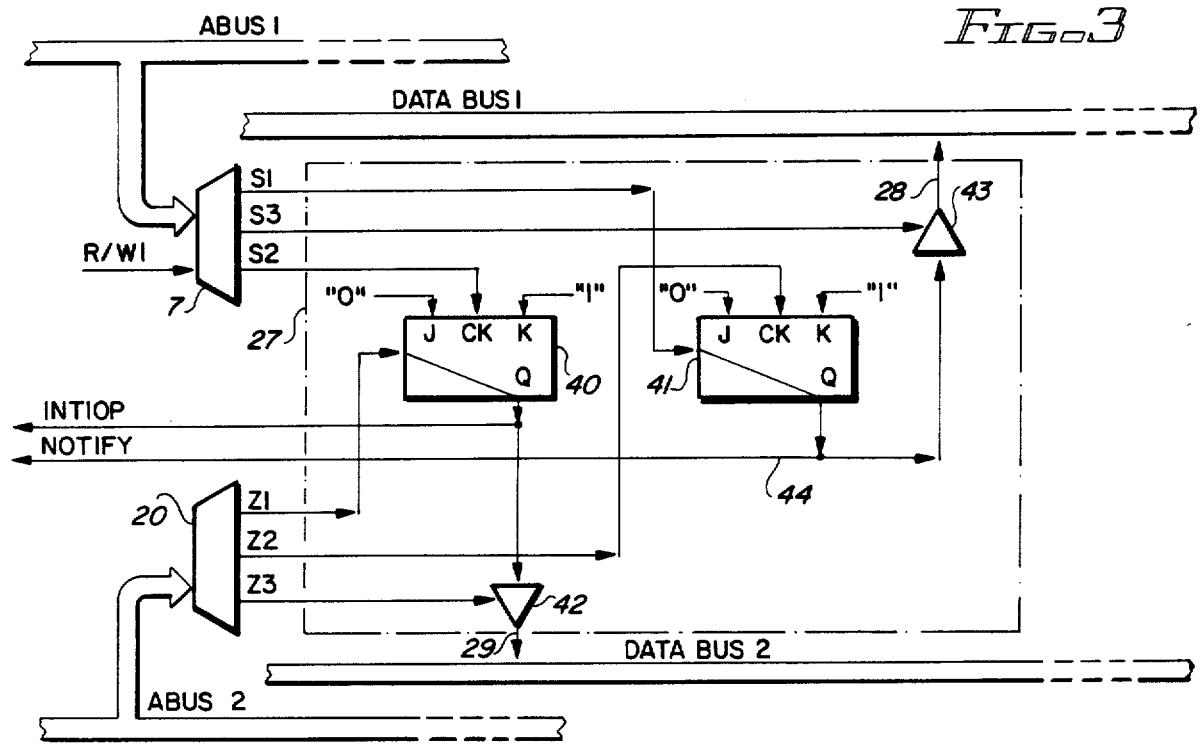
FIG. 3 illustrates a circuit diagram of a preferred embodiment of a logic unit, generating the notify and interrupt signals, used in the EDP architecture of FIG. 1.

Details of notify logic unit 27 are illustrated in FIG. 3. Unit 27 includes two J-K flip-flops 40, 41, and two "tristate drivers" 42, 43. Flip-flop 40 receives, at its set input, a selection signal Z1 coming from decoder 20, and is set by such signal. At the direct output Q of flip-flop 40, a signal INTIOP is therefore generated which is sent to the interrupt logic unit 8 of CPU 1 (FIG. 1).

Direct output Q of flip-flop 40 is also connected to the input of driver 42, whose output is connected, through bus 29 (constituted in this case, by one only lead) to DATA BUS 2. Driver 42 is enabled by signal Z3 coming from decoder 20. J-K inputs of flip-flop 40 are permanently kept at logical levels "0" and "1" respectively, so that on receipt of a clock signal at its input CK, flip-flop 40 is reset. Clock input terminal CK of flip-flop 40 receives command signal S2 coming from decoder 20. Likewise, flip-flop 41 receives on its set input terminal a set signal S1 coming from decoder 7 and on its clock input terminal CK a reset signal Z2 coming from decoder 20. Output Q of flip-flop 41 is connected through driver 43 and bus 28, constituted in this case by only one lead, to DATA BUS 1. Driver 43 is enabled by a signal S3 coming from decoder 7. Output Q of flip-flop 41 is further connected through lead 44 to an input of interrupt network 21 as signal NOTIFY. When flip-flop 41 is set, an interrupt NOTIFY signal is sent, through lead 44, to unit 21 and from unit 21 to processor I/OP 2 as signal IPLEV. The operation of logic unit 27 and of the two processor system 80, within which it is included, will now be described. When I/OP 2 wants to send a message to CPU 1 or to have CPU 1 execute a process, for instance a computational process, it executes in order the following operations:

1. Verifying, through a Test and Set operation, that mailbox 30 for CPU 1 is available (i.e., lock bit L=0) and consequently mailbox 30 is available to receive a message.

2. Writing a message into mailbox CPU 1.

3. Making mailbox 30 available by resetting lock bit "L" in location 32. Operations 1. 2. 3. require access to bus 82 and to memory 4, or stated another way, bus 82 and memory 4 are temporarily locked.

4. Set flip-flop 40 by generation, on bus ABUS 2 only, of a suitable address code which when decoded by decoder 20, generates signal Z1. Signal INTIOP is therefore generated which, through interrupt logic 8 and according to the established priorities, is transferred to CPU 1 as an interrupt code IPLEV having a preestablished priority level PL, FIG. 1. This operation only requires use of I/O bus 84 and does not need system bus 82 and memory 4. At this point, the interrupted processor CPU 1, once it has executed all operations having a higher priority than that of the interrupt accepts the interrupt and executes an interrupt handling process involving the following operations.

5. Verifying, through a Test & Set operation, that mailbox 30 for CPU 1 is available, its associated lock bit L=0 and consequently locking mailbox 30 if it is available.

6. Reading out the message from mailbox 30.

7. Deleting of the message.

8. Making available the mailbox by resetting its associated lock bit L to a logical zero.

9. Resetting flip-flop 40 by generation, on bus ABUS 1 only, of a suitable address code which, when decoded by decoder 7, generates signal S2.

10. Operating according to the instructions or information contained in the received message.

All these operations require the use of bus 82 only and do not involve bus 84 so that I/OP 2 can function in an autonomous way, executing other processes using all the resources connected with I/OP bus 84. Particularly processor I/OP 2 can send another message to CPU 1 and verify if mailbox 30 is available. To do this, I/OP 2 does not have to execute a memory polling operation, which would require use of memory 4. It has only to generate, on bus ABUS 2, an address code, which when decoded by decoder 20, generates signal Z3. This signal enables gate 42 and allows it to read flip-flop 40's status through DATA BUS 2. If flip-flop 40 is set, it means that the interrupt has not been considered yet or that the reading out of the contents of mailbox 30 by CPU 1 has not been completed. Then, to verify if the reading of mailbox 30 has been executed, I/OP 2 has only to execute an operation to determine the status of flip-flop 40, which requires only the use of I/OP bus 84 and without interfering with CPU 1's operations. However, if flip-flop 40 is reset, the interrupt has certainly been considered, the contents of mailbox 30 read, and therefore mailbox 30 is able to accept a new message. I/OP 2 can therefore access mailbox 30 of CPU 1 to write a new message, knowing that a polling operation is not required and that a Test & Set operation, operation 1, will be successful. In other words, the ability of I/OP 2 verify flip-flop 40's status provides I/OP 2 with important information which can be used in several ways. First, if the rule is respected that a mailbox cannot receive a new message before the previously received message has been acted upon, the Test & Set operations steps 1 and 5 become unnecessary. The communication mechanism between several processors through a mailbox and a notify, or interrupt signal, can therefore be used in systems where the processors do not have the capability of executing an indivisible Test & Set instruction. In fact, if flip-flop 40 is reset, I/OP 2 will know that mailbox 30 is available as CPU 1 does not have any reason to operate on an empty mailbox in the absence of a notify, or interrupt, signal. For the same reason CPU 1, once an interrupt, or notify, message, or signal, is received, is certain that the notifying processor I/OP 2 will not access its mailbox again to write a new message before CPU 1 has taken into account any message already stored in its mailbox 30. This further improves system performances because not only can the status, or state of flip-flop 40 be detected through a polling operation at the local us level, but also because certain operations Test & Set and consequent lock bit reset requiring the use of system level resources can be completely avoided.

Alternatively it is possible to execute "preemption" operations, that is the substitution of another message for a message already stored in a mailbox with a priority signal. To make possible such a preemption operation, without incurring errors, it suffices to modify the procedure by which CPU 1 handles a interrupt, so that step number 9) precedes step number 8). In other words it suffices that CPU 1 reset flip-flop 40 before resetting lock bit L. If this is done, then processor I/OP 2, once it has stored a message into CPU 1 mailbox 30 and set flip-flop 40, can execute a polling operation of flip-flop 40 without accessing bus 82 and memory 4.

In the event it is required that the already sent message be deleted and replaced with another, processor I/OP 2 tests the status of flip-flop 40. If flip-flop 40 has been reset, the message has already been considered by CPU 1 and mailbox CPU 1 30 has already been read or is going to be read. In this case, the preemption operation cannot and need not be executed and processor I/OP 2, after having tested that mailbox 30 of CPU 1 is actually available, can store the new message therein. If on the other hand, flip-flop 40 is still set, the message has not been considered yet, or is in the process of being read out. The lock bit status indicates which one of these alternatives applies. I/OP 2 can therefore verify the lock bit status through a Test & Set operation. If the resource is available, (L=0), the message is certainly present in mailbox and no reading operation is required to verify its presence. The message can therefore be replaced by a new message. If the resource is not available, the message for CPU 1 is of course being read and the preemption operation is not permitted. It is clear that the possibility of executing a preemption operation can be verified without any memory polling operation and without using common resources.

It has been said that to make the preemption operation without possible errors, flip flop 40 must be reset before lock bit L is reset. Actually it is enough that lock bit L not be reset before flip-flop 40. These two operations can therefore occur contemporaneously and, for this purpose, signal S2 may be obtained by decoder 7 decoding an address code, addressing mailbox 30 of CPU 1, and by CPU 1 using a reset or write command. In other words decoding network 7 can receive, in addition to signals present on bus ABUS 1 a command R/W 1, an output from CPU 1 representative of the type of operation to be executed. This command is shown both in FIG. 1 and in FIG. 3. The previous descriptions, made with reference to flip-flop 40 are obviously valid for flip-flop 41 too, that is the mechanism of notifying processor I/OP 2 of a message from CPU 1.

It is clear that notify logic unit 27 disclosed with reference to FIG. 3 constitutes a preferred embodiment of the notify logic of the present invention and that several changes can be made to unit 27 without departing from the scope of the invention.

Figure 4:
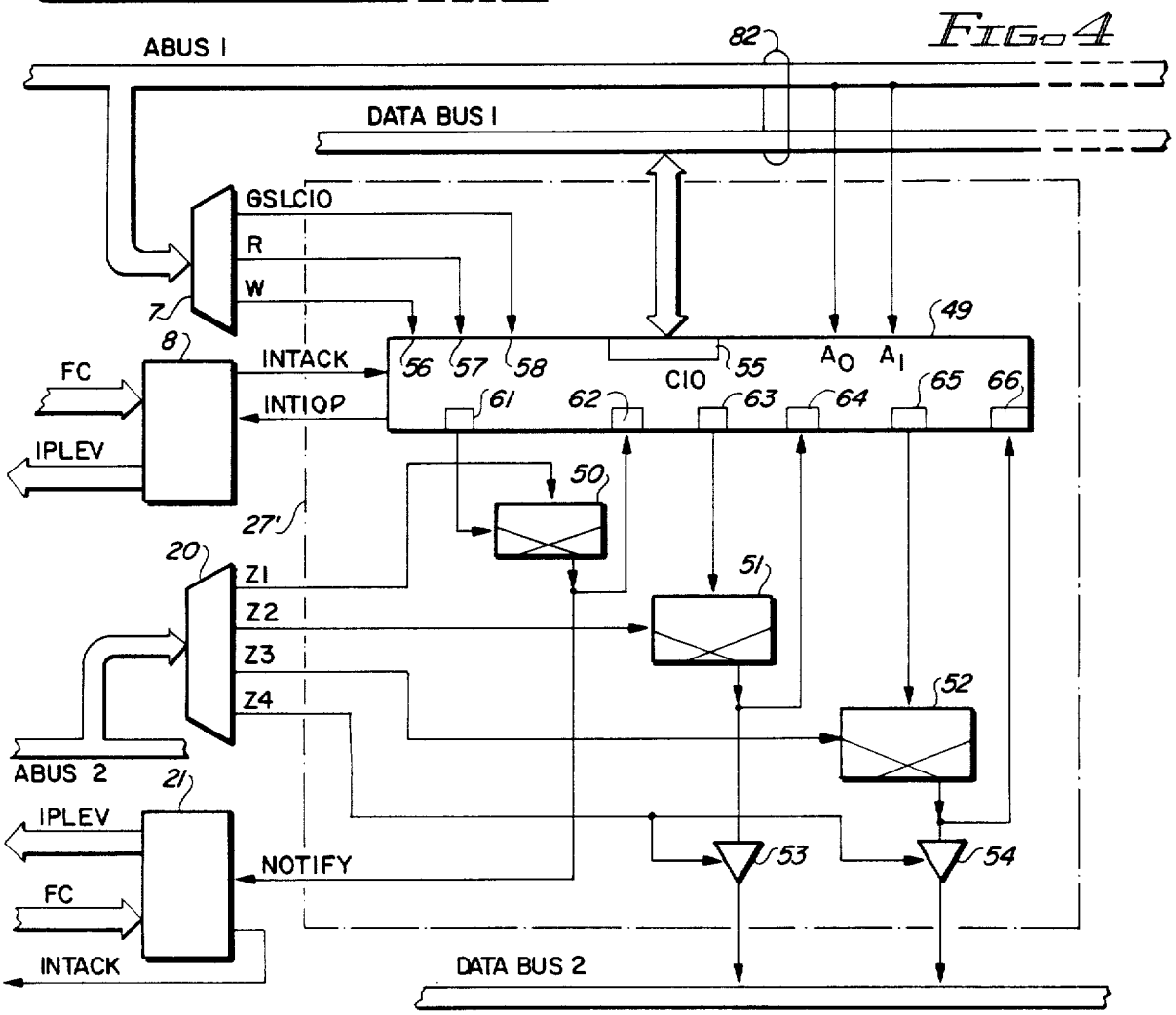
FIG. 4 shows a second embodiment of a logic unit, generating notify and interrupt signals, used in the EDP architecture of FIG. 1.

FIG. 4 illustrates another embodiment of logic unit 27 which takes into account two further factors. It would in fact be suitable that the interrupt notifying mechanism itself supplies the address of the interrupt handling program and that a processor supplies interrupt/notify signals of different levels according to the type and urgency of the notify message. These two concepts must be clarified before considering FIG. 4. The answer of a processor to an interrupt signal can be, as is known, of two kinds, that is the interrupt handling, or processing, can occur in two different ways. In a first way, defined as autovectored handling, the processor stops both running operations and the running program, saves the set of information necessary to recall the interrupted program at a suitable time, and jumps, in an autonomous way, to an interrupt handling program whose beginning is at a preestablished address known to the processor. In the previous description reference has been made to this kind of interrupt handling.

The autovectored process requires actions to occur in a certain severely restricted manner and generally requires long and complicated programs, some of which are required to detect the kind and the particular reason for the interrupt. Alternatively, to obtain a higher degree of flexibility in the allocation of the interrupt handling programs, the interrupt can be treated in a vectored way. In the vectored way the interrupted processor, when taking into account the received interrupt generates a signal INTACK, as an acknowledgment of the receipt of the interrupt, and requests with such signal, that the interrupting unit inform through a vectored code, of the interrupt handling program address which must be used for that particular interrupt. With such distinctions of interrupts, the following concept is evidenced. A unit can interrupt a processor for completely different reasons. For instance, an essential distinction exists between an interrupt sent because a character, or more generally a set of data, has to be transferred defined as an I/O transfer interrupt and an interrupt sent because the interrupting unit must know that certain operations such as a row of printing has been completed, or that a paper feed instruction has been executed in the case of printers, or a track seek has been completed in the case of disk units. These latter kind of interrupts are known as I/O termination interrupt. It is clear that different interrupt requests may be generated by generating different interrupt signals as well as by characterizing a common signal with an interrupt vector. Many microprocessors are available on the market which allow interrupts to be handled in these two different ways. Among those having such a capability are the 68000 and 68010 used in the preferred embodiment of this invention. Microprocessor 68000, or 68010, is provided with three inputs IPLEV, for receiving a three bit interrupt code, which enables CPU 1 to identify up to 7 different levels of interrupts with three output signals FC allowing CPU 1 to signal its status and the type of interrupt program it is executing. Particularly, when the three outputs FC are all at a logical level the program in execution is a interrupt acknowledging one. By a logical AND operation on the three outputs, its signal INTACK, acknowledging receipt of the interrupt, is generated. Microprocessor 68000 (or 68010) is further provided with an input VPA (FIG. 1) for receiving a signal which, when at logical level 0, during an interrupt acknowledge cycle, indicates that the interrupt is of the "autovectored" type.

In FIG. 4 logic unit 27' together with the system elements connected to it are illustrated. Buses ABUS 1, DATA BUS 1, ABUS 2, DATA BUS 2, address decoders 7, 20 and the interrupt logic units 8 and 21 of system 80 are shown. Logic unit 27' comprises an integrated circuit input/output controller CIO 49, three flip-flops 50, 51, 52 and two driver gates 53, 54. CIO circuit 49 is a Z8536 which is manufactured by ZILOG. It essentially consists of three programmable timing counters, three data input/output gate sets and internal control registers. Circuit details and the several operations that such a circuit can execute will not be considered as they can be easily found in the ZILOG technical manual "Z8036 Z-CIO/Z8536-CIO/Counter Timer and Parallel I/O Unit" ZILOG 1982 . . . However, it is to be noted that the circuit 49 is provided with an 8 bit input/output bidirectional gate 55, for data exchange with DATA BUS 1, three control inputs 56, 57, 58 for receiving a write command W, a read out command R, and a selection command GSLCIO respectively, two inputs A1, A0 for receiving register selection signals, 3 input/output gate registers and a control register, one terminal for outputting an interrupt signal INTIOP, and one input for receiving an interrupt acknowledging signal INTACK. CIO circuit 49 is further provided with 3 port registers communicating devices external to CIO 49. Such registers can be controlled to receive or to output binary information. The several register cells can be individually controlled to constitute input/output elements.

In addition, when the cells are set to receive signals from outside of CIO 49, they can be further controlled so that, on receipt of a signal at a preestablished level or, on receipt of a signal transition from level 0 to 1 or from level 1 to 0, CIO circuit 49 generates an interrupt signal. To each element or input cell, an interrupt address "vector" can be coupled, or associated, which is stored in an internal control register of CIO 49 and which can be read out through port 55. For purposes of the present invention, FIG. 4 shows CIO circuit 49 as being provided with 6 cells numbered from 61 to 66, respectively belonging to one of the three port registers of CIO 49. CIO 49 receives suitable outputs from decoder 7 including selection signal GSLCIO, a write command W and a read out, or read, command R. Selection inputs A0, A1 are connected to two leads of address bus ABUS 1. Thus, CIO circuit 49 can be addressed and controlled, by suitable address codes, through ABUS 1 and signals from decoder 7, to perform write operation, information storing, read operation, information being read out through gate 55 and DATA BUS 1, and preset for operating in a suitable way. More particularly CIO 49 can be set so that cells 61, 63, 65 act as output cells, and cells 62, 64, 66 as input cells, and that by a transition of an input signal from 0 to 1 applied to cells 64, 66 an interrupt signal is generated. Further, two different interrupt vectors with preestablished relative priorities are coupled to cells 64, 66 when operating in the PRIORITY ENCODED VECTOR mode. The set input of flip-flop 50 is connected to output cell 61, and its Q output is connected to cell 62, acting as input, as well as to interrupt logic unit 21 to which output Q supplies a NOTIFY signal.

Flip-flops 51, 52 have their clock input terminals connected to the output of cells 63, 65 respectively and their Q outputs connected to cells 64, 66 respectively as well as to DATA BUS 2 through drivers 53, 54 respectively. Suitable outputs of decoder 20 are respectively connected to the clock input of flip-flop 50 and to the set input of flip-flops 52, 52 which are supplied with signals Z1, Z2, Z3 respectively. A fourth signal Z4 from decoder 20 enables driver gates 53, 54.

Once CIO 49 is set, through suitable commands, the operation of notify unit 27' will now be described. When CPU 1 has to send a notify signal to processor I/OP 2 it selects a CIO circuit with a suitable address and controls the generation of a pulse at logical level 1 on cell 61's output. This pulse sets flip-flop 50 which sends a notify/interrupt signal to interrupt network 21. This, as already stated, in the absence of an interrupt signal at the highest priority level, generates an interrupt code IPLEV which is sent to processor I/OP 2.

When I/OP 2 examines the interrupt, it generates an FC code with all the bits at logical level 1 which is sent to unit 21. Unit 21 decodes the FC code and generates an interrupt acknowledge signal INTACK which is applied to input VPA of processor I/OP 2 and indicates that the just acknowledged interrupt is an "autovectored" interrupt..

Processor I/OP 2 then, in an autonomous way, proceeds with the handling of the interrupt, by reading out the message intended for it from its memory mailbox 34.

As a result, a suitable address code is applied by IOP 2 to bus ABUS 2, and through decoder 20, which generates signal Z1 resetting flip-flop 50. During this interval CPU 1 can verify the notify operation status by addressing and selecting CIO 49 to execute a read operation from cell 62. This operation requires access to bus 82 and therefore prevents I/OP 2 from using any of the common resources of the system. However, the required time for executing such an operation is very short compared with a memory polling operation to obtain the same information. Such an operation would in fact require as a first step, the execution of a Test & Set operation and, if this is successful, the reading out of the associated mailbox, and the subsequent reset of its lock bit. Likewise, processor I/OP 2 can send notify signals to CPU 1 by generating a suitable code on bus ABUS 2. The generation of signal Z2 by decoder 20 sets flip-flop 51 and the generation of signal Z3 sets flip-flop 52. The signal transition at the output of flip-flops 51–52, respectively received by input cells 64, 66 of CIO 49, generates interrupt signal INTIOP. This signal, received by interrupt unit 8, is transferred to CPU 1 with due observance of priority in the case of concurrent interrupt signals as the coded signal IPLEV. CPU 1 answers, at a suitable time, with an acknowledging code FC which is decoded by unit 8 to an interrupt acknowledging signal INTACK. This signal received by CIO 49 authorizes CIO 49 to transfer an interrupt vector corresponding to the acknowledged interrupt through gate 55 to DATA BUS 1.

Depending on whether the interrupt is caused by flip-flop 51, and therefore the result, for example, of a data transfer need, or by flip-flop 52 and thus the result, for example of the termination of some executed command, a different interrupt vector is sent to CPU 1. CPU 1 can, therefore, directly access the handling routine for that particular interrupt and can read out from its mailbox the message containing the interrupt parameters. Once read out, the message is deleted, and CPU 1 resets flip-flops 51 or 52 by selecting and controlling CIO 49 so that a reset pulse appears at output cells 63 or 65. During this time interval I/OP 2 can verify the status, pending or considered, of the notified message by generating signal Z4 which enables driver gates 53 and 54 to transfer the states of flip-flops 52, 52 on to DATA BUS 2.

This operation does not require an access to bus 82 or to common resources connected to bus 82 and is completed in a very short period of time, a machine cycle, as wait intervals are not necessary, such as generally occur in the case of a memory read because the required information is immediately available. The embodiment of FIG. 4 illustrates that notify logic 27' can be arranged to function in either the autovectored or the vectored modes, and that each notifying unit requesting an interrupt can generate different kinds or levels of notify signals without loosing the advantages offered and disclosed with reference to the embodiment illustrated in FIG. 3.

It is further clear that, while a two processor system has been disclosed, with each processor having its own bus and a memory connected to that bus, that the bus and memory of one processor can constitute common resources which can be accessed by both the processors. The same inventive concept can be used in systems where more than two processors are used, with suitable changes which, at this point, will be obvious to those skilled in the art. In the previous description reference has not been made to the processors timing and dialogue details which depend on the kind of processors used and are not essential for understanding this invention. For such details, with reference to microprocessor 68000 and 68010, manufactured by Motorola, Inc. and by Mostek, reference is made to the manual "MICRO-ELECTRONIC DATA BOOK" May 1982 - Page Vi-1+VI-50 published by MOSTEK 1982/1983.

What is claimed is:

1. In a multiprocessor system having a plurality of data processing system, each data processing system having a processor whereby each data processing system is able to operate in an autonomous manner and wherein each of the plurality of data processing systems includes a first data processing system having a first processor operatively connected to a first bus, and a second data processing system having a second processor operatively connected to a second bus, each of said buses including a corresponding address bus and a corresponding data bus, and further wherein said first data processing system includes a main memory operatively connected to said first bus, said main memory being a common resource of said multiprocessing system, said main memory further having mailboxes, said mailboxes being predetermined locations of said main memory dedicated to a predetermined processor accessible by all the processors whereby messages may be written into the mailboxes by a processor initiating communications, a transmitting processor, said multiprocessor system further including an apparatus for controlling communications between said data processing systems, said apparatus comprising:

(a) unidirectional channel means, operatively connected to each address bus, for coupling address information applied to the second address bus by said second processor to said first address bus in response to a first enable selection signal;

(b) bidirectional channel means, operatively connected to each data bus, for coupling data information between said first and second data processing system in response to a second enable selection signal, the direction of transfer of the data information via said bidirectional channel means being controlled by a R/W command signal; and (c) first logic means, operatively connected to each data bus and operatively connected to each processor, said first logic means generating an interrupt signal for one processor, a receiving processor, in response to input signals via the address bus of another processor, the transmitting processor.

2. An apparatus for controlling the communications between said data processing system, according to claim 1, wherein said first logic means comprises:

(a) a plurality of interrupt generating means, each interrupt generating means for generating an interrupt to a predetermined receiving processor and each interrupt generating means being operatively coupled to the predetermined receiving processor, each interrupt generator means producing an interrupt in response to at least one input signal derived from signals from the address bus of the transmitting processor; and (b) a plurality of enabling means, each enabling means operatively connected to a corresponding interrupt generating means, each enabling means operatively connected to a predetermined data bus, for coupling the interrupt signal generated for the receiving processor, to the transmitting processor, in response to at least one input signal derived from signals from the transmitting processor transmitted over the address bus of the transmitting processor, thereby allowing the transmitting processor to monitor the status of the communications without use of the common resource including the bus of the receiving processor.

3. An apparatus for controlling the communications between said data processing system, according to claim 1, said apparatus further comprising:

(a) conflict resolving means, operatively connected to each of said data processing systems, and operatively connected to said unidirectional channel means and to said bidirectional channel means, for generating said first and second enable selection signals and said R/W command signals in response to bus access request signals from each of the data processing systems desiring to initiate communications, to resolve conflicts from the data processing systems attempting to access the common resource and the bus associated therewith.

4. An apparatus for controlling the communications between said data processing system, according to claim 1 wherein said first logic means comprises:

(a) a plurality of circuit means, each circuit means for generating an interrupt signal and a priority encoded vector associated with the interrupt signal, each interrupt signal and the priority encoded vector associated therewith being operatively coupled to a predetermined receiving processor, each interrupt signal and associated priority encoded vector being generated in response to at least one input signal derived from signals from the address bus of a transmitting processor; and (b) a plurality of enabling means, each enabling means operatively connected to a corresponding circuit means and operatively connected to a predetermined address bus and data bus, for coupling the priority encoded vector to the transmitting processor in response to at least one input signal derived from signals from the address bus of the transmitting processor, thereby allowing the transmitting processor to monitor the status of the interrupt to the receiving processor without use of the bus of the receiving processor.

5. A method of providing communication between a first and a second processor provided respectively with a first and a second autonomous bus, which buses can be selectively connected to each other, a random access memory operatively connected to the first bus, said random access memory having a mailbox associated with each processor at a predetermined location and accessible to said first and second processor, and interrupt signal generator means operatively connected to said first and second autonomous buses for generating a notify signal for each processor to initiate an interrupt operation by the processor to which the notify signal is transmitted and having a notify flip flop associated with each processor, the status of which identifies if a processor has an interrupt to service or if the processor is in condition to receive an interrupt request or notify signal; said method comprising the following steps:

(a) executed by an interrupt initiating processor of:
 1. verifying that the mailbox associated with the interrupt receiving processor is available to receive a message;
 2. writing a message into said mailbox;

3. making said mailbox available for a read or write operation;
4. causing the interrupt signal generator means to produce a notify signal, to transmit the notify signal to the interrupt receiving processor, and to set the notify flip flop associated with the interrupt receiving processor;
5. checking the status of the interrupt request by sensing the notify flip flop associated with the interrupt receiving processor, the sensing being achieved via the autonomous bus of the interrupt initiating processor thereby sensing without interfering with the operation of the interrupt receiving processor;

(b) the interrupt receiving processor on receiving notify signal executing the following steps:
1. verifying that its associated mailbox is available for a read operation;
2. reading from its mailbox the message stored therein;
3. deleting the message;
4. making the mailbox available for a read or write operation;
5. resetting its notify flip flop; and
6. executing an operation according to the information contained in the received message.

6. A method of providing communication between a CPU processor and an IOP processor provided respectively with a CPU bus and an IOP bus, which buses can be selectively connected to each other, a random access memory operatively connected to the subsystem bus, said random access memory having a mailbox associated with each processor at a predetermined location and accessible to said first and second processor, and interrupt signal generator means operatively connected to said CPU bus and IOP two buses for generating a notify/interrupt signal for each processor to initiate an interrupt operation by the processor to which the notify signal is transmitted and having at least two notify flip flops associated with the CPU processor and at least one notify flip flop associated with the IOP processor, the states of the notify flip flops associated with the CPU processor which when set identify that the CPU processor has an interrupt to service and produces a priority encoded vector which identifies a type of interrupt service request by the IOP processor or, when interrogated by the IOP processor via the IOP autonomous bus, indicates that the CPU processor is in condition to receive an interrupt request or notice signal; said method comprising the following steps:

(a) executed by the IOP processor when requesting an interrupt service by the CPU processor:
1. verifying that the mailbox associated with the CPU processor is available to receive a message;
2. writing a message into said mailbox;
3. making said mailbox available for a read or write operation;
4. causing the interrupt signal generator means to produce a notify signal and a priority encoded vector, the interrupt signal generator means thereby transmitting the notify signal and priority encoded vector to the CPU processor, the priority encoded vector being generated by the setting of predetermined ones of the notify flip flops of the CPU processor by the IOP processor via the IOP bus;
5. checking the status of the interrupt request by sensing the notify flip flops associated with the CPU process, the sensing being achieved via the IOP autonomous bus without interfering with the operation of the CPU processor;

(b) the CPU processor on receiving a notify signal executing the following steps:
1. verifying that its associated mailbox is available for a read operation;
2. reading from its mailbox the message stored therein;
3. deleting the message;
4. making the mailbox available for a read or write operation;
5. resetting its notify flip flop; and
6. executing an operation according to information contained in the message received from its mailbox and the priority encoded vector.

* * * * *